US005171926A

United States Patent [19]

Besnainou et al.

[11] Patent Number: 5,171,926

[45] Date of Patent: Dec. 15, 1992

[54] BOW MUSICAL INSTRUMENT MADE OF COMPOSITE MATERIAL

[75] Inventors: Charles Besnainou, Bures-Sur-Yvette; Stéphane Vaiedelich, Paris, both of France

[73] Assignee: Centre National de la Recherche Scientifique, Paris, France

[21] Appl. No.: 651,358

[22] PCT Filed: Jul. 3, 1990

[86] PCT No.: PCT/FR90/00501

§ 371 Date: Feb. 20, 1991

§ 102(e) Date: Feb. 20, 1991

[87] PCT Pub. No.: WO91/00589

PCT Pub. Date: Jan. 10, 1991

[30] Foreign Application Priority Data

Jul. 5, 1989 [FR] France ................................ 89 09048

[51] Int. Cl.[5] ................................................ G01D 1/02

[52] U.S. Cl. ........................................ 84/275; 84/291; 84/452 P

[58] Field of Search ....................... 84/275, 291, 452 P

[56] References Cited

U.S. PATENT DOCUMENTS 3,699,836 10/1972 Glasser .................................. 84/275
4,364,990 12/1982 Haines .................................. 84/184
4,408,516 10/1983 John ...................................... 84/275

FOREIGN PATENT DOCUMENTS 8807251 9/1988 European Pat. Off. .

*Primary Examiner*—Michael L. Gelliner
*Assistant Examiner*—Cassandra Spyrou
*Attorney, Agent, or Firm*—Griffin, Butler, Whisenhunt & Kurtossy

[57] ABSTRACT

A bow musical instrument in which at least the front (1) is constituted by a thin wall of composite material comprising at least two superposed sheets (A, B, C, D, . . . ) of crossed and directed long fibers, the wall being covered on at least one of its faces with a lining material (Y, Z) of considerably lower density than the fibers, wherein the deposition of the sheets of fibers is such that the ratio of the longitudinal modulus of elasticity divided by the transverse modulus of elasticity of the wall is higher in a wall zone close to the longitudinal axis of symmetry of the instrument than it is for a zone close to the sides of the instrument.

4 Claims, 1 Drawing Sheet

BOW MUSICAL INSTRUMENT MADE OF COMPOSITE MATERIAL

The present invention relates to a bow musical instrument, i.e. to an instrument belonging to the violin, viola, cello, and double-bass family.

Attempts have been made for many years, and without much success, to replace the wood used in instruments of this type by a composite material based on sheets of long fibers. The advantage of such a composite material lies in it remaining perfectly stable over time in spite of hygrometric and temperature variations, unlike wood. Another advantage lies in the theoretical possibility of having a material whose characteristics are constant and accurately identified, thereby making it possible to obtain repeatability in manufacture which is impossible when using wood. That is why industrial manufacture of violins made of wood has never yet given rise to remarkable instruments, and the violins concerned are used merely for study or practice.

Making violins out of composite material, i.e. in which at least the front is based on directed fibers (of carbon or of aromatic polyamides, etc.) disposed in layers that are crossed to a greater or lesser extent and are interconnected by resin, has always been a failure, since the sounds produced have never been able to achieve the richness of the sounds produced by a conventional instrument.

The present invention seeks to provide an instrument using a composite material as one of its components while avoiding the drawbacks of prior instruments.

To this end, the present invention therefore provides a bow musical instrument in which at least its front is constituted by a thin wall of composite material comprising at least two superposed sheets of crossed and directed long fibers, the wall being covered on at least one of its faces with a lining material of considerably lower density than the fibers, wherein the disposition of the sheets of fibers is such that the ratio of the longitudinal modulus of elasticity of the wall divided by the transverse modulus of elasticity of the wall is higher in a wall zone close to the longitudinal axis of symmetry of the instrument than it is for a zone close to the sides of the instrument.

It has been observed that a vibrating wall having these characteristics enables rich sounds to be produced comparable to those produced by good quality violins. Given the properties of a long fiber composite structure, the moduluses of elasticity depend essentially on the direction of the fibers and on the number of fibers in a given direction.

Thus, when considering an element of wall in cross-section and the projections of a unit length of each fiber passing through said element of the wall both onto the plane of the section and onto a plane perpendicular thereto, the product of the number of longitudinal projections multiplied by their length compared with the product of the number of transverse projections multiplied by their length is higher for an element of wall close to the center of the cross-section than it is for an element of wall close to its edges. In other words, two variant embodiments of the invention can be defined depending on whether action is taken on the number of sheets in the wall, which number varies from the center to the edge, or whether action is taken on the directions of the fibers in each sheet, for an identical number of sheets. Naturally, both possibilities may be combined.

In the general context of this structure, the composite structure can be modified locally to reinforce this or that portion of the wall, in particular in the vicinity of the sound post.

Embodiments of the invention are given in the following description in order to show up secondary characteristics and advantages.

Reference is made to the accompanying drawings, in which.

Figure 1:
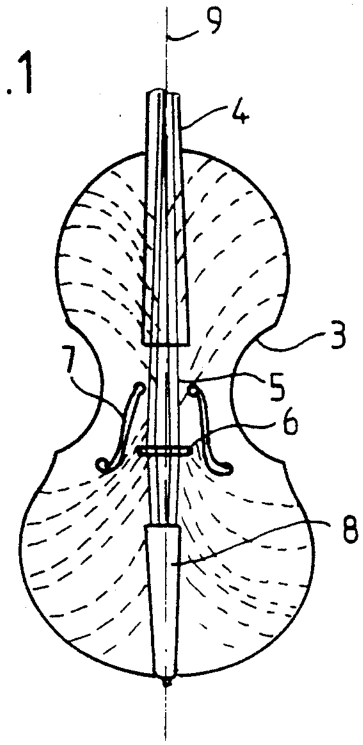
FIG. 1 is a front view of a violin in which at least its front is in accordance with the invention.
Figure 2:
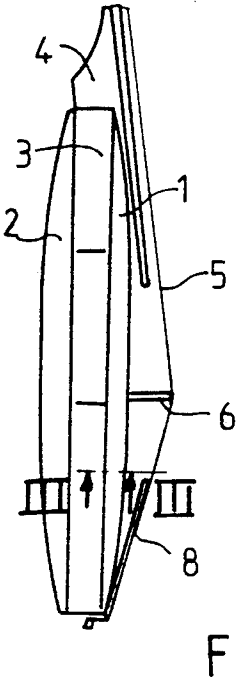
FIG. 2 is a side view of the FIG. 1 violin.

The violin shown in FIGS. 1 and 2 conventionally comprises a front 1, a back 2, and ribs 3 closing the sides of its sound body. A neck 4 is connected to the sound body with strings 5 being fixed to the end thereof by pegs, these strings passing over a bridge 6 situated between the f-holes 7 in the front, and terminating on the tailpiece 8 of the instrument.

The front 1 is a curved wall formed by molding a composite material comprising superposed sheets (A, B, C, D, . . . ) of carbon fibers preimpregnated with a polymerizable resin, these sheets crossing at selected angles. Each face of this composite wall is covered with a wood veneer Y or Z determing the vibratory characteristics of the front (damping, reduction in overall density of the wall, . . . ).

Figure 3:
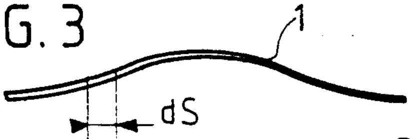
FIG. 3 is a section on line III—III of FIG. 2 through the front of the violin.
Figure 4:
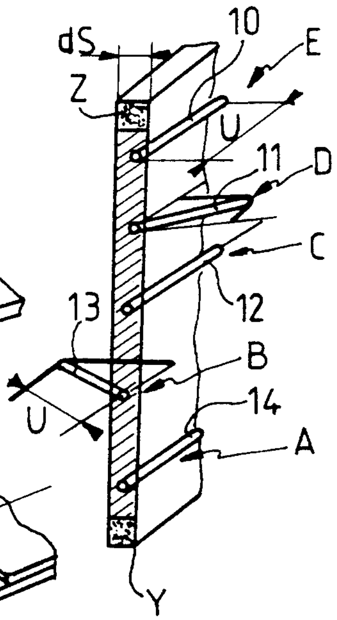
FIG. 4 is an enlarged view of an element of the section of FIG. 3.

FIG. 4 is a diagram of an element dS of the section of the front shown in FIG. 3. This element is greatly magnified for explanatory purposes and has fibers 10 to 14 (or bundles of fibers) passing therethrough in determined directions which depend on the sheet to which the fibers belong, and/or which depend on the positions of the fibers within the sheet.

For example, the fibers 10, 12, and 14 belonging to different sheets are perpendicular to the section element dS and are thus parallel to the longitudinal axis of symmetry 9 of the instrument. Fibers 11 and 13 belong to sheets which are interposed between the above-mentioned sheets and they are at an angle relative to the fibers 10, 11, and 12. If a unit length U is taken for each of these fibers and projected firstly onto the plane of the section and secondly onto a plane perpendicular to said section, the ratio of the linear sum of these projections in each of these two planes is representative of the ratio of the transverse and longitudinal moduluses of elasticity. It will thus be understood that if each section element dS at any point in the wall has the same number of fibers passing through it in identical directions, then the ratio of these moduluses of elasticity is constant. In contrast, if on going away from the axis of symmetry 9 a sheet of longitudinally directed fibers is removed, then the magnitude representative of the sums of the projections in the longitudinal plane of symmetry of the instrument is reduced without altering the other magnitude in the plane of the section (since the fibers that have been removed have a zero length projection in this plane), thereby altering the ratio of longitudinal modulus of elasticity (which becomes smaller) divided by the transverse modulus of elasticity which remains practically unchanged, with this ratio itself becoming smaller.

Likewise, if the number of sheets is maintained throughout the wall, but the direction of the fibers in each sheet changes so as to make them more and more "transverse" on going away from the axis of symmetry towards the edges, then the sum of the longitudinal projections becomes smaller and the sum of the transverse projections becomes larger and so the above-mentioned ratio of the moduluses of elasticity becomes smaller.

Figure 5:
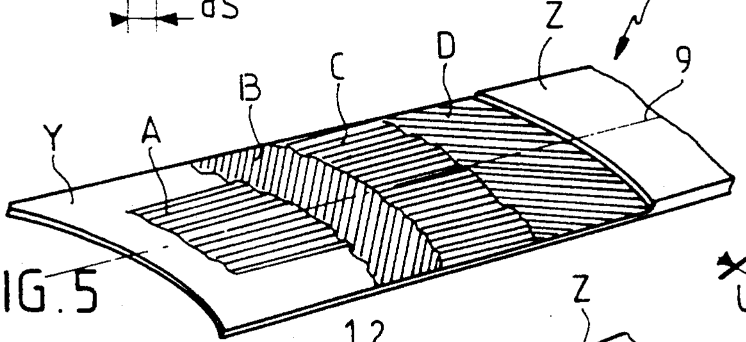
FIGS. 5 and 6 are diagrams showing two possible basic structures for a composite wall usable as the front or the back of a violin.

FIG. 5 shows a wall in accordance with the invention in which one of the sheets of fibers A is truncated laterally. The wall constructed in this way thus has a smaller ratio of moduluses of elasticity at its edges than at its center. Naturally, the sheet A may be cut out to follow an outline which is adapted to the final shape of the violin.

Figure 6:
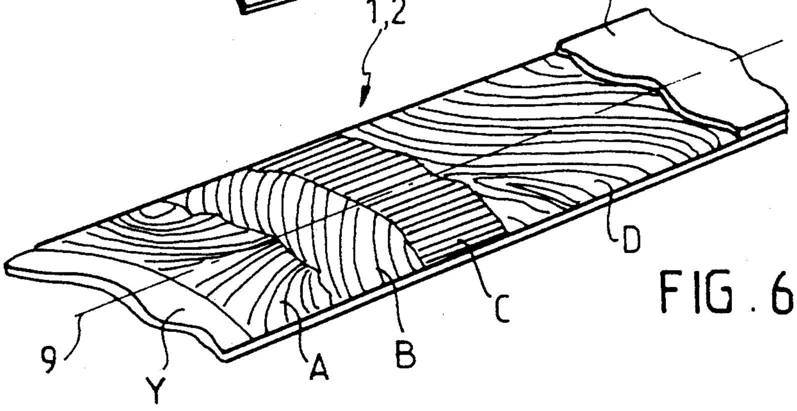

FIG. 6 shows that at least one of the sheets A has fibers whose direction is much more "transverse" at the edges than in the center where the fibers lie nearly parallel to the axis of symmetry of the wall. By combining one or more sheets of this type and by crossing them with layers of rectilinear fibers extending longitudinally or at an angle, this means also gives rise to a wall structure satisfying the desired characteristics.

In FIG. 1, the dashed lines are intended to show that the front 1 includes some sheets such as the sheet A in FIG. 6. It could also include sheets such as the sheet A in FIG. 5. These dispositions show that the ratio of the moduluses of elasticity is at a maximum in the center of the instrument along its own longitudinal axis of symmetry 9.

The above description of the front is equally applicable to the back of the sound body.

Finally, the front of the sound body and its back may include local reinforcement by adding additional sheets over small areas. For example, a violin contains a sound post disposed inside the sound body and constituting a (slight) force-fit between the front and the back, with the sound post being disposed close to one of the ends of the bridge. The areas in which the front and the back come into contact with the post may be reinforced by adding partial additional sheets thereto before applying the veneer, thereby reinforcing these areas mechanically where the posts concentrate stress. Naturally, in these areas the ratio of the moduluses of elasticity may be greater than that in the vicinity of the axis of symmetry of the wall, and therefore a fortiori, greater than a zone adjacent to the sides of the instrument, but the area concerned is small. Thus, generally speaking and except for certain particular locations (particular mention may be made of certain longitudinal strips on the back wall), the ratio of the moduluses of elasticity falls off either continuously or in steps going from the center towards the sides.

We claim:

1. In a bow musical instrument including an upper sound board with a longitudinal axis of symmetry, a longitudinal modulus of elasticity and a transverse modulus of elasticity, and said sound board being constituted by a thin wall of composite material, the improvement comprising the sound board having at least two superposed sheets of long fibers, the thin wall being covered on at least a face thereof with a lining material of substantially lower density than that of the fibers, and wherein a disposition of the sheets of fibers is such that elements of cross-section of the thin wall and projections of unit lengths of each fiber passing through said elements, firstly on a plane of the cross-section and secondly on a plane perpendicular thereto, a number of longitudinal projections multiplied by the lengths thereof compared with a number of transverse projections multiplied by the lengths thereof is higher for an element close to said axis than for an element close to an edge of the thin wall, so that a ratio of said longitudinal modulus divided by said transverse modulus varies such that it is higher in a zone of the thin wall close to said axis than in a zone close to the edge thereof.

2. A musical instrument according to claim 1, wherein a directions of the fibers passing through the elements are identical regardless of the position of said elements, with the said variations in the ratios being obtained by a reduction in the number of sheets of fibers extending essentially in the longitudinal direction and near the edge.

3. A musical instrument according to claim 1, wherein the number of fibers passing through each element of the cross-section is constant regardless of the position of said element, with the said variations in the ratios being obtained by progressively changing the orientation of the fibers in each sheet with respect to the longitudinal axis.

4. A musical instrument according to claim 1, wherein the thin wall includes at least one area which is reinforced by at least one additional sheet of fibers.

* * * * *